United States Patent [19]

Wada et al.

[11] Patent Number: 4,504,881
[45] Date of Patent: Mar. 12, 1985

[54] PROTECTIVE CIRCUIT FOR AN ELECTRIC MOTOR

[75] Inventors: Kinzo Wada, Yokohama; Ken Enami, Kawasaki, both of Japan

[73] Assignee: Victor Company of Japan, Ltd., Japan

[21] Appl. No.: 448,775

[22] Filed: Dec. 10, 1982

[30] Foreign Application Priority Data

Dec. 21, 1981 [JP] Japan .................................. 56-206592

[51] Int. Cl.³ ............................................ H02H 7/093
[52] U.S. Cl. ......................................... 361/23; 361/28; 361/240; 361/242; 318/434; 318/461; 318/476
[58] Field of Search ...................... 361/23, 51, 28, 236, 361/239, 240, 241, 242; 318/434, 312, 328, 461, 476; 340/648

[56] References Cited

U.S. PATENT DOCUMENTS

| 3,636,545 | 1/1972 | Boyd et al. | 361/51 X |
| 3,845,375 | 10/1974 | Stiebel | 361/23 X |
| 3,931,557 | 1/1976 | Osburn | 361/23 X |
| 4,314,186 | 2/1982 | Gille et al. | 361/51 X |

Primary Examiner—Patrick R. Salce
Attorney, Agent, or Firm—Andrus, Sceales, Starke & Sawall

[57] ABSTRACT

A protective circuit for an electric motor comprises a frequency signal generating circuit for generating a frequency signal in accordance with the rotational speed of the motor, a switching circuit switched over to either permit or cut off supply of current to the motor, and a detecting circuit for detecting that the period of the generated frequency signal has become larger than a predetermined period due to a decrease in the rotational speed of the motor, and cutting off the supply of current to the motor by the switching circuit.

7 Claims, 3 Drawing Figures

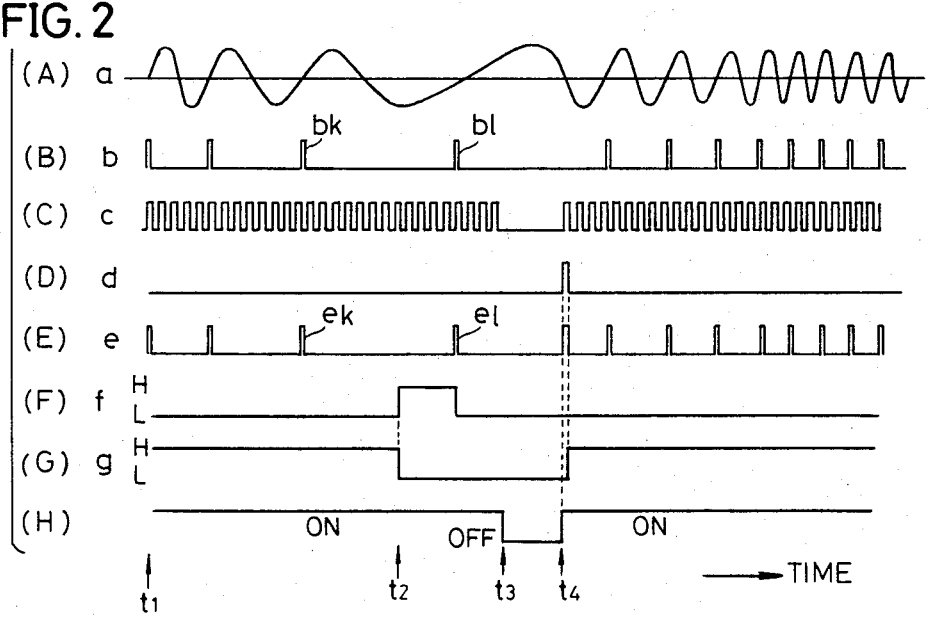

PROTECTIVE CIRCUIT FOR AN ELECTRIC MOTOR

BACKGROUND OF THE INVENTION

The present invention generally relates to protective circuits for electric motors, and more particularly to a protective circuit for an electric motor, designed to detect abnormal decrease in the rotation of the electric motor when the rotation of the electric motor decreases abnormally due to causes such as overload on the electric motor, and cut off the supply of current to the electric motor.

Generally, when the load on an electric motor becomes excessively large, including the case where the rotation of the motor is mechanically restricted, the rotation of the motor greatly decreases or the motor stops rotating. However, in such a case, a control circuit for the motor operates so as to supply a larger current to the motor and rotate the motor at a constant speed. Hence, if the current is continuously supplied to the motor, the motor will abnormally generate heat to result in the breakdown of the motor.

Accordingly, there was a conventional device for protecting the motor, wherein temperature detecting devices were provided on a main motor body and a heat generating part of a driving device. In this device, the temperature detecting devices detected the generation of heat at the main motor body and/or the driving device caused by the overload, and the current supply to the motor was cut off according to the detected outputs of the temperature detecting devices, in order to protect the motor. However, this conventional protective device was designed to detect an abnormal state by detecting the above generation of heat. Thus, a relatively long period of time was required before such an abnormal state could be detected, and there was a disadvantage in that the degree of protection with respect to the motor was insufficient and the motor could break down before the abnormal state is detected. In addition, in the conventional protective device, the temperature detecting devices had to be provided on both the main motor body and the driving device. Therefore, this resulted in an increased number of parts, and there was a further disadvantage in that the protective device could not be manufactured at low cost.

SUMMARY OF THE INVENTION

Accordingly, it is a general object of the present invention to provide a novel and useful protective circuit for an electric motor, in which the above described disadvantages have been overcome.

Another and more specific object of the present invention is to provide a protective circuit for an electric motor, designed to cut off the supply of current to the motor by detecting an abnormal decrease in the rotation of the motor due to overload and the like. According to the circuit of the present invention, the motor can be protected quickly, because an abnormal state such as overload can be detected quickly. Moreover, the circuit according to the present invention can be manufactured at low cost, since the circuit construction is simple and does not require temperature detecting devices and the like.

Still another object of the present invention is to provide a protective circuit for an electric motor, designed to cut off the supply of current to the motor by detecting an abnormal decrease in the rotation of the motor by use of an output of a rotation detector which detects the rotation of the motor in a rotation control system while the motor is undergoing normal rotation. According to the circuit of the present invention, the supply of current to the motor can be cut off immediately even when the above rotation detector and the like breaks down. As a result, an accident is prevented from occurring wherein the motor is erroneously controlled to undergo high-speed rotation by a speed control system and overruns.

Other objects and further features of the present invention will be apparent from the following detailed description when read in conjunction with the accompanying drawings.

BRIEF DESCRIPTION OF THE DRAWINGS

FIGS. 2(A) through 2(H) are graphs, respectively showing signal waveforms at each part of the block system shown in FIG. 1.

DETAILED DESCRIPTION

Figure 1:
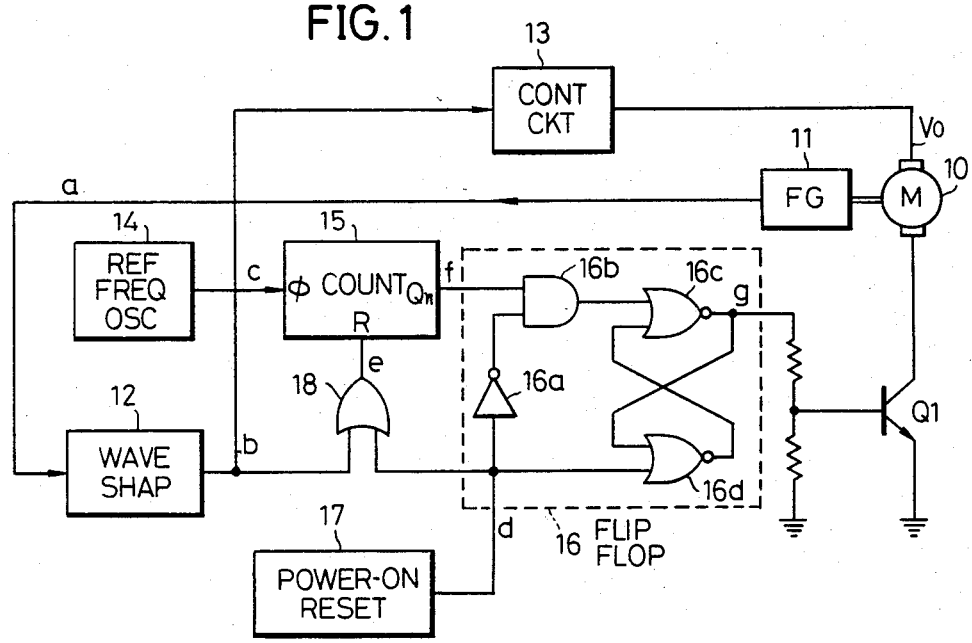
FIG. 1 is a systematic block diagram showing an embodiment of a protective circuit for an electric motor according to the present invention.

In FIG. 1, an electric motor 10 is a D.C. motor of a permanent-magnet field type. A signal a shown in FIG. 2(A) having a frequency in accordance with the rotational speed of the motor 10, is obtained from a frequency generator 11 provided at a rotational shaft of the motor 10. The signal a is amplified, subjected to wave-shaping, and differentiated at a wave shaping circuit 12, and formed into a pulse signal b shown in FIG. 2(B). The signal b has a period identical to that of the signal a. The pulse signal b is supplied to a known rotational speed control circuit 13 on one hand. The motor 10 is thus controlled to rotate at a constant rotational speed, by a control signal $V_o$ obtained from the control circuit 13. During normal rotation of the motor 10, a transistor Q1 connected to an armature current circuit is ON. Hence, the motor 10 is supplied with the armature current, and controlled to rotate at a constant speed according to the control signal $V_o$.

A reference frequency signal oscillator 14 produces a reference frequency signal c shown in FIG. 2(C), and supplies this signal c to a clock input terminal of a frequency counter 15 having a frequency dividing ratio n. The output pulse signal b of the wave shaping circuit 12 is applied to a reset terminal of the counter 15, through an OR-gate 18. An output of the counter 15 assumes high level when n reference frequency signals c are counted. However, during normal rotation of the motor 10, the signal b is applied to the reset terminal of the counter 15 to reset the counter 15, before the counter 15 counts up to the predetermined number n. Accordingly, during normal rotation of the motor 10, the output signal f of the counter remains at low level as indicated on the right side in FIG. 2(F). As will be described hereinafter, a reset signal d shown in FIG. 2(D) obtained from a power-on reset circuit 17 is applied to the OR-gate 18, and an output signal e of the OR-gate becomes as shown in FIG. 2(E). Thus, the signal e is actually applied to the reset terminal of the counter 15 as the reset signal.

The output signal f of the counter 15 is applied to a reset-and-set (R-S) flip-flop circuit 16 comprising an inverter 16a, an AND-gate 16b, and NOR-gates 16c and 16d in a flip-flop connection. During the low-level period of the signal f, an output g of the flip-flop circuit 16 assumes high level as indicated on the right end in FIG. 2(G). Accordingly, the transistor Q1 which is supplied with the output g of the flip-flop circuit 16 to its base is ON. The emitter of the transistor Q1 is grounded, and the collector of the transistor Q1 is connected to the motor 10. As a result, the armature current flows to the motor 10 through the transistor Q1, and the motor 10 is continuously rotated at a constant speed.

If the motor 10 is overloaded at a time t1 due to some cause, the motor 10 can no longer maintain constant rotation even with the control signal $V_o$ supplied thereto from the control circuit 13, and the rotational speed of the motor 10 accordingly decreases. As the rotational speed of the motor 10 decreases, the output signal frequency of the frequency generator 11 decreases, and the pulse period of the signal b gradually becomes large. As a result, the period with which the counter 15 is reset gradually becomes large.

As the rotation of the motor 10 further decreases and a time interval between pulses $b_k$ and $b_l$, that is, a time interval between reset signals $e_k$ and $e_l$, becomes larger than the time it takes for the counter 15 to count up to n, the counter 15 is reset by the signal $e_k$. The counter 15 finishes counting up to n at a time t2, before being reset by the signal $e_l$, and the output f of the counter 15 assumes high level.

When the output f of the counter 15 assumes high level, the state of the flip-flop circuit 16 becomes reversed by the rise in the output f. Thus, the output g of the flip-flop circuit 16 assumes low level. Hence, the transistor Q1 is turned OFF at this point in time, and the supply of armature current to the motor 10 is cut off. Accordingly, when the motor 10 is overloaded, it is possible to positively and quickly protect the motor 10 and the related circuits and the like from generation of heat and breakdown due to the generation of heat.

After the supply of armature current to the motor 10 is cut off by the transistor Q1 at the time t2 as described above, the signal $b_l$ ($e_l$) is generated due to the inertial rotation of the motor 10, and the counter 15 is reset. Thus, even if the output f assumes low level, the output g of the flip-flop circuit 16 remains at the low level. Hence, the supply of armature current to the motor 10 is continuously cut off.

By the above described operation of the protective circuit, it is detected that the supply of armature current to the motor 10 is automatically cut off, and the power source is turned OFF manually, for example, at a time t3 as shown in FIG. 2(H). The motor 10 is returned to the normal state, after removing the cause such as overload which caused the abnormal state.

Thereafter, the power source is turned ON again at a time t4 as shown in FIG. 2(H). When the power source is turned ON, the reset signal d shown in FIG. 2(D) is produced from the power-on reset circuit 17, and this reset signal d is supplied to the reset terminal of the counter 15 through the OR-gate 18. The reset signal d is also supplied to the flip-flop circuit 16. The counter 15 is reset by the reset signal d (e), and the output f thereof either assumes low level or remains at the low level. The flip-flop circuit 16 is reversed of its state by the reset signal d, and the output signal g thereof changes to high level from low level. Accordingly, the transistor Q1 becomes ON, and the armature current is supplied to the motor 10 to start rotating the motor 10.

When the power source is turned ON at the time t4, the reference frequency signal oscillator 14 also resumes its operation, and the counter 15 counts the reference frequency signal c and is reset by the signal b. In this state, because the cause for causing the abnormal state such as overload is eliminated, the motor 10 quickly assumes steady-state rotation to rotate at a constant speed. The counter 15 is reset by the signal b before counting n signals c, since the motor 10 undergoes steady-state rotation. Therefore, the output f of the counter 15 remains at low level, and the transistor Q1 is maintained in its ON state.

On the other hand, upon starting of the motor 10, the rotational speed of the motor 10 is slow until it reaches the steady-state rotation. Accordingly, the period of the reset signal b upon starting of the motor 10 is large. For this reason, the counter 15 completes the count up to n before being reset, and the output f assumes high level. As a result, it becomes necessary to take measures so that the protective circuit does not operate to turn the transistor Q1 OFF. If the rotational angle of the motor 10 is represented by $\theta$, the moment of inertia by J, the starting moment by $M_m$, the load moment by $M_l$, the time by t, and the viscous drag by D, the following equation stands.

$$\theta = \frac{M_m - M_l}{D}\left(t + \frac{J}{D}e^{-\frac{D}{J}t} - \frac{J}{D}\right)$$

In the above equation, $\theta = 0$ and $d\theta/dt = 0$, when $t = 0$. Accordingly, if the period of the reference signal c is represented by $t_s$, the frequency dividing ratio of the counter 15 by n, and the rotational angle of the motor 10 from the start to $nt_s$ by $\theta_s$, the following equation stands.

$$\theta_s = \frac{M_m - M_l}{D}\left(nt_s + \frac{J}{D}e^{-\frac{D}{J}nt_s} - \frac{J}{D}\right)$$

In addition, the condition to be satisfied so that the output f of the counter 15 does not assume high level upon starting of the motor 10, is $2\pi/m < \theta_s$, where the number of pulses generated by the frequency generator 11 for one rotation of the motor 10 is represented by m. Therefore, the constants must be determined so as to satisfy the condition defined by the following equation.

$$\frac{2\pi}{m} < \frac{M_m - M_l}{D}\left(nt_s + \frac{J}{D}e^{-\frac{D}{J}nt_s} - \frac{J}{D}\right)$$

In actual practice, the constants related to the motor 10 will be determined if the motor 10 to be used is determined. The frequency dividing ratio (count) n of the counter 15 and/or the number of pulses m from the frequency generator 11 may be determined according to these constants, so that the above equation stands.

The protective circuit may be designed so as not to utilize the power-on reset circuit 17. In this case, the power source is not turned OFF after the abnormal state is detected, and the cause of this abnormal state is eliminated while the power source is ON. In this case, a signal similar to the reset signal d is supplied to the flip-flop circuit 16.

If abnormality is introduced at the frequency generator 11 and/or the wave shaping circuit 12, for example, in the conventional rotational speed control system comprising the frequency generator 11, the wave shaping circuit 12, and the rotational speed control circuit 13, the signal b ceases or the period of the signal b becomes large. These are equivalent to the cases where the rotation of the motor 10 is stopped or decreased. Hence, the rotational speed control circuit 13 carries out control so as to increase the rotational speed of the motor 10, and the rotational speed of the motor 10 increases abnormally, to result in an accidental overrun of the motor 10. However, in the present embodiment of the invention, the frequency generator 11 and the wave shaping circuit 12 in the rotational speed control system are commonly used for the protective system. Hence, even if abnormality is introduced in either one of these circuits 11 and 12 and the signal b ceases or the period of the signal b becomes abnormally large, the protective circuit system operates similarly as in the case where the motor 10 rotates abnormally. That is, the transistor Q1 is turned OFF, to stop the rotation of the motor 10. Therefore, according to the present invention, an accident in which the motor 10 overruns, is prevented by the rotational speed control system.

Figure 3:
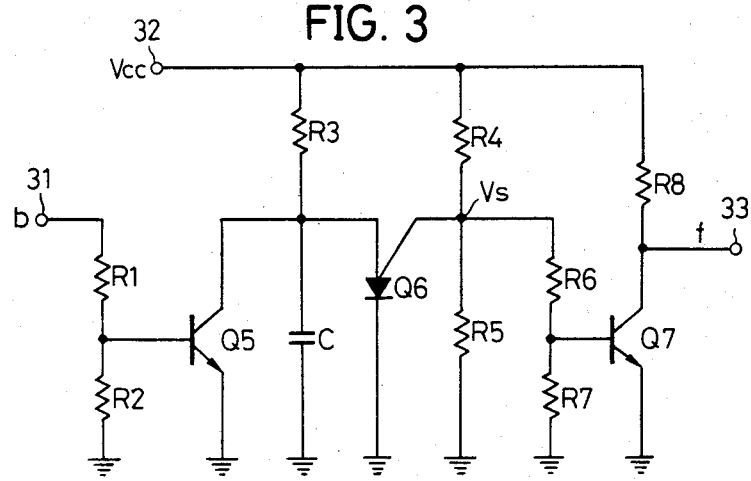
FIG. 3 is a systematic circuit diagram showing another embodiment of a part of the block system shown in FIG. 1.

A circuit shown in FIG. 3 may be used instead of the reference frequency signal oscillator 14 and the counter 15. In FIG. 3, the signal b from the wave shaping circuit 12 is supplied to a terminal 31, and is then applied to the base of a transistor Q5 having its emitter grounded. A resistor R3 and a capacitor C are connected to the collector of the transistor Q5. A programmable uni-junction transistor (hereinafter simply referred to as PUT) Q6 is further connected to the collector of the transistor Q5. The PUT Q6 is connected to the base of a transistor Q7 which has its emitter grounded. A circuit comprising the PUT Q6, resistors R3 through R5, and the capacitor C, constitute an oscillation circuit utilizing the PUT.

When the pulse signal b is applied to the terminal 31, the transistor Q5 is turned ON, and a charged electrical charge in the capacitor C is quickly discharged through the transistor Q5. When the pulse signal b ceases (corresponding to the low-level period between the signals b and b), the transistor Q5 is turned OFF, and a voltage from a terminal 32 charges the capacitor C through the resistor R3. When the motor 10 is undergoing steady-state rotation, a succeeding pulse b is obtained before the capacitor C is charged up to a predetermined voltage, to discharge the capacitor C. Accordingly, while the motor 10 undergoes steady-state rotation, the terminal voltage of the capacitor C does not reach the predetermined voltage, and the PUT Q6 is in the OFF state. In this state, a voltage $V_{cc}$ is divided by resistors R5 and R6, and further divided by resistors R6 and R7, before being applied to the base of a transistor Q7, to put the transistor Q7 in an ON state. Thus, the output signal f obtained from an output terminal 33 connected to the collector of the transistor Q7, remains at low level.

If the motor 10 is overloaded and the rotational speed of the motor 10 decreases abnormally, and the period of the pulse signal b becomes abnormally large (long), the capacitor C becomes charged up to the predetermined voltage before being discharged. In this case, the PUT Q6 becomes ON, and the capacitor C is discharged through the PUT Q6. In addition, a gate voltage $V_s$ of the PUT Q6 at a connection point between the resistors R4 and R5 decreases, to put the transistor Q7 in the OFF state. As a result, the output f from the terminal 33 assumes high level. The high-level output f from the terminal 33 is supplied to the flip-flop circuit 16, and as in the previously described embodiment, the output g of the flip-flop circuit 16 assumes low level. Therefore, the transistor Q1 is turned OFF and the current supply to the motor 10 is cut off, to protect the motor 10.

If the gate voltage of the PUT Q6 when the PUT Q6 is OFF is represented by $V_s$, the anode-cathode voltage when the PUT Q6 is ON by $V_v$, the offset voltage of the PUT Q6 by $V_T$, and the power source voltage by $V_{cc}$, an oscillation output f which alternately and repeatedly assumes high level and low level is obtained from the terminal 33, when a time $t_o$ corresponding to the low-level period of the output pulse signal b of the wave shaping circuit 12 satisfies the following condition.

$$t_o > CR3 \cdot \ln \frac{1}{1 - \frac{V_s + V_T - V_v}{V_{cc} - V_v}}$$

The first rise to high level in the output f is used for carrying out the protective operation.

Further, the present invention is not limited to these embodiments, but various variations and modifications may be made without departing from the scope of the present invention.

What is claimed is:

1. A protective circuit for an electric motor comprising:
    frequency signal generating means for generating a frequency signal in accordance with the rotational speed of the motor;
    a switching circuit switched over to either permit or cut off supply of current to said motor;
    a detecting circuit for detecting that the period of the generated frequency signal has become larger than a predetermined period due to a decrease in the rotational speed of said motor, and cutting off the supply of current to said motor by said switching circuit; and
    a rotational speed control circuit responsive to the generated frequency signal from said frequency signal generating means, for controlling the rotational speed of the motor;
    said detecting circuit comprising an oscillator for producing a reference frequency signal, and a frequency counter reset by the frequency signal from said frequency signal generating means, for counting the output reference frequency signal of said oscillator.

2. A protective circuit as claimed in claim 1 in which said counter produces an output when a period with which the counter is reset by said frequency signal becomes larger than a predetermined period, to cut off the supply of current to said motor by said switching circuit.

3. A protective circuit as claimed in claim 2 in which a frequency dividing ratio of said counter is n, and said counter produces an output when the period of said frequency signal becomes larger than a predetermined period and n reference frequency signals are counted before being reset by said frequency signal.

4. A protective circuit as claimed in claim 1 in which said switching circuit comprises a switching element connected within a current circuit of said motor, said switching element being switched over between ON and OFF states, and a flip-flop controlled responsive to the output of said counter, said flip-flop having a first terminal for receiving an input which causes the switching element to switch over from an ON state to an OFF state and a second terminal for receiving an input which causes the switching element to switch over from an OFF state to an ON state.

5. A protective circuit as claimed in claim 4 which further comprises a circuit for supplying a reset signal to said counter and said flip-flop when a power source is turned OFF and thereafter turned ON again.

6. A protective circuit as claimed in claim 1 in which said rotational speed control circuit carries out a control so that the rotational speed of said motor becomes constant.

7. A protective circuit as claimed in claim 1 in which said frequency signal generating means comprises a frequency generator for generating a signal having a frequency in accordance with the rotational speed of said motor, and a wave shaping circuit for subjecting an output signal of said frequency generator to wave-shaping, to produce a pulse having a period in accordance with the frequency of the output signal of said frequency generator.

* * * * *